United States Patent
Rácz et al.

(10) Patent No.: US 9,451,500 B2
(45) Date of Patent: Sep. 20, 2016

(54) CONDITIONAL ROUTING TECHNIQUE

(71) Applicant: Telefonaktiebolaget L M Ericsson (publ), Stockholm (SE)

(72) Inventors: Sándor Rácz, Cegléd (HU); Jonas Edstam, Mölndal (SE); Balázs Peter Gerö, Budapest (HU); János Harmatos, Budapest (HU); Karl-Magnus Möller, Göteborg (SE); Szilveszter Nádas, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 64 days.

(21) Appl. No.: 14/357,719

(22) PCT Filed: Sep. 17, 2012

(86) PCT No.: PCT/EP2012/003870
§ 371 (c)(1),
(2) Date: May 12, 2014

(87) PCT Pub. No.: WO2013/071993
PCT Pub. Date: May 23, 2013

(65) Prior Publication Data
US 2014/0341042 A1 Nov. 20, 2014

Related U.S. Application Data

(60) Provisional application No. 61/560,479, filed on Nov. 16, 2011, provisional application No. 61/560,551, filed on Nov. 16, 2011.

(51) Int. Cl.
*H04W 28/08* (2009.01)
*H04W 28/02* (2009.01)
(Continued)

(52) U.S. Cl.
CPC ............ *H04W 28/08* (2013.01); *H04L 47/122* (2013.01); *H04L 47/125* (2013.01); *H04L 47/14* (2013.01); *H04L 47/30* (2013.01); *H04W 28/0231* (2013.01)

(58) Field of Classification Search
None
See application file for complete search history.

(56) References Cited

U.S. PATENT DOCUMENTS 7,233,569 B1 * 6/2007 Swallow ............ H04L 12/4633
370/225
7,275,103 B1 9/2007 Thrasher et al.
(Continued)

FOREIGN PATENT DOCUMENTS

CA 2770376 A1 2/2011
CA 2771818 A1 3/2011
(Continued)

OTHER PUBLICATIONS

IEEE, "IEEE Standard for Local and metropolitan area networks—Virtual Bridged Local Area Networks Amendment 5: Connectivity Fault Management", IEEE Computer Society Std 802.1ag, Dec. 17, 2007, 1-260.
(Continued)

*Primary Examiner* — Candal Elpenord
(74) *Attorney, Agent, or Firm* — Murphy, Bilak & Homiller, PLLC

(57) ABSTRACT

A technique for controlling network routing in a network (100) is provided. The network (100) includes a first end node (102) and a second end note (104). The end nodes are connectable along a first routing path (106) by at least one link (113). The network (100) further provides a second routing path (108) including the first end node (102) and the second end nodes (104). As to a method aspect of the technique, one or more queues (402) are provided. Each of the queues (402) serves at least one tunnel (Tunnel_1; Tunnel_2) along the first routing path (106). A switching of the tunnel (Tunnel_1) to the second routing path (108) is triggered based on a combination of two pieces of information. A piece of information includes information as to a queue build-up at the queue (504) serving the tunnel (Tunnel_1). Another piece of information includes information as to a capacity of the link (113) of the first routing path (106).

22 Claims, 6 Drawing Sheets

(51) Int. Cl.
*H04L 12/803* (2013.01)
*H04L 12/801* (2013.01)
*H04L 12/835* (2013.01)

(56) References Cited

U.S. PATENT DOCUMENTS

| | | | | |
|---|---|---|---|---|
| 7,525,950 | B1* | 4/2009 | Zhang | H04M 15/00 370/352 |
| 7,525,960 | B2* | 4/2009 | Grabner | H04L 12/4633 370/226 |
| 7,693,055 | B2* | 4/2010 | Vasseur | H04L 12/4633 370/230 |
| 7,852,748 | B2* | 12/2010 | Le Faucheur | H04L 45/22 370/217 |
| 8,165,015 | B1* | 4/2012 | Busch | H04L 12/4633 370/228 |
| 9,036,481 | B1* | 5/2015 | White | H04L 47/11 370/235 |
| 2002/0064172 | A1* | 5/2002 | Siu | H04L 49/106 370/429 |
| 2002/0143983 | A1* | 10/2002 | Jones | H04L 47/2491 709/237 |
| 2007/0248016 | A1 | 10/2007 | Ashwood Smith et al. | |
| 2008/0008092 | A1* | 1/2008 | Wang | H04L 47/10 370/235 |
| 2008/0281987 | A1 | 11/2008 | Skalecki et al. | |
| 2010/0039935 | A1 | 2/2010 | Davison et al. | |
| 2010/0061244 | A1 | 3/2010 | Meier et al. | |
| 2010/0303024 | A1* | 12/2010 | Gossain | H04W 72/04 370/329 |
| 2011/0028146 | A1 | 2/2011 | Tammisetti et al. | |
| 2012/0014261 | A1 | 1/2012 | Salam et al. | |
| 2012/0020222 | A1 | 1/2012 | Nishioka et al. | |
| 2012/0140625 | A1 | 6/2012 | Long et al. | |
| 2012/0163224 | A1 | 6/2012 | Long et al. | |
| 2012/0275295 | A1 | 11/2012 | Tanikawa et al. | |
| 2013/0070654 | A1 | 3/2013 | Nishimura et al. | |

FOREIGN PATENT DOCUMENTS

| | | |
|---|---|---|
| CN | 1889547 A | 1/2007 |
| CN | 101989917 A | 3/2011 |
| EP | 1416681 A1 | 5/2004 |
| WO | 2011020422 A1 | 2/2011 |
| WO | 2011022998 A1 | 3/2011 |
| WO | 2011083747 A1 | 7/2011 |
| WO | 2011145708 A1 | 11/2011 |

OTHER PUBLICATIONS

Author Unknown, "Ethernet Linear Protection Switching", ITU-T; G.8031/Y.1342; Telecommunication Standardization Sector of ITU. Series G: Transmission Systems and Media, Digital Systems and Networks; Packet over Transport aspects—Ethernet over Transport aspects; Series Y: Global Information Infrastructure, Internet Protocol Aspects and Next-Generation Networks; Internet protocol aspects—Transport. Jun. 2011. pp. 1-94.

Author Unknown, "IEEE Standard for Local and Metropolitan Area Networks—Link Aggregation", IEEE Std 802.1AX—2008. IEEE Computer Society. Institute of Electrical and Electronics Engineers, Inc. Nov. 3, 2008. pp. 1-163. New York, NY, US.

Author Unknown, "OAM Functions and Mechanisms for Ethernet Based Networks", ITU-T; G.8013/Y.1731 (Nov. 2013). Telecommunication Standardization Sector of ITU. Series G: Transmission Systems and Media, Digital Systems and Networks; Packet over Transport aspects—Ethernet over Transport aspects; Series Y: Global Information Infrastructure, Internet Protocol Aspects and Next-Generation Networks. Nov. 2013. pp. 1-95.

* cited by examiner

CONDITIONAL ROUTING TECHNIQUE

TECHNICAL FIELD

The present disclosure generally relates to a technique for controlling data flow in a network and to network components thereof. In particular, and without limitation, the disclosure relates to a technique that determines conditions for rerouting the data flow.

BACKGROUND

Modern communication networks carry a plurality of different services, such as voice and data services. From a technical point of view, the role taken by the network, or a sub-network thereof, in carrying services can be considered as providing a network connection, wherein requirements as to availability and capacity of the network connection often depend on the type of service. Availability refers to the degree to which the network connection is in a specified state of operation suitable for the service, such as the existence of network connectivity at a specified capacity. Capacity refers to the data rate provided by the network connection. The actual physical routing path used in the network for providing the network connection is often subordinate for the service at an application layer and should be transparent to a user.

Adaptive Modulation (AM) applied to a link in the network, e.g., a link using microwave equipment, is an efficient tool to increase the capacity of the link. There is often a trade-off between availability and capacity. For example, a microwave link is planned for a small Bit Error Rate (BER) at a basic modulation level applied during a major part of its operation time, which results in approximately 99.999% availability of the link. Adaptive modulation means that in good radio conditions, the microwave channel is able to provide significantly higher capacity using higher modulation levels with lower availability. For example, the availability can decrease from 99.995% to 99.9% the higher the modulation level. A currently used modulation level thus depends on current radio channel conditions, such as a Signal-to-Noise Ratio (SNR). The automatic changing between modulation levels according to AM provides the highest available link capacity given the current radio channel conditions.

Different types of services have different Quality of Service (QoS) requirements including a minimum capacity and a maximum time of outage. In a double-connected network, for example using microwave links, it is possible to protect the services carried by the basic modulation level by a protection switching mechanism. When the link capacity is going down to zero, the protected traffic is rerouted to an alternative path, which does not contain the failed link. Herein, "failed" and "fault" refer to the outage of network connectivity. The Recommendation ITU-T G.8031/Y.1342 defines an examples of the protection switching mechanism in the context of Ethernet Operation, Administration and Maintenance (OAM). For example, in the context of voice telecommunication, services can tolerate only a short time of outage. Consequently, the rerouting, which is also referred to as switching, should be completed within a limited restoration time, for example within 50 ms.

Conventional protection switching mechanisms only detect the loss of connectivity, for example, because continuity check messages with high priority are used to probe the connectivity. A reduction in link capacity to an insufficient but non-zero capacity, for example due to AM, is not detected, although the service is already affected or even has collapses as a consequence of the insufficient reduced link capacity.

Other conventional techniques reroute services when it is not even necessary. When the link capacity is degraded, a predefined rerouting can be performed by default for some demands. However, if the actual traffic volume of a service is less than the degraded link capacity, rerouting is unnecessary and would add a futile workload for the network.

A possible solution for avoiding unnecessary service rerouting could base the rerouting decision on a measurement of both the actual traffic volume needed for the service and the actual link capacity available to the service. However, such measurements and their subsequent analysis take too long to fulfill the limited restoration time. Furthermore, the measurements require additional hardware equipment and software. Moreover, the measurements cause additional network traffic.

SUMMARY

Accordingly, there is a need for a technique that more accurately routes services in a network in compliance with certain quality of service requirements.

According to one aspect, a method of controlling network routing in a network includes the step of triggering a protection switching based on the combination of current link capacity information and queue build-up information.

According to another aspect, a method of controlling network routing in a network is provided. The network includes a first end node and a second end node connectable along a first routing path via at least one link. The network further provides a second routing path including the first end node and the second end node. The method comprises the steps of providing one or more queues, each of which serves at least one tunnel along the first routing path; and triggering a switching of at least a portion of the at least one tunnel to the second routing path based on a combination of information as to a queue build-up at the queue serving the tunnel and information as to a link capacity of at least one of the links of the first routing path.

The expression "queue build-up" of a queue may encompass at least one of a certain level of aggregation of data by the queue, a certain increase of data aggregated by the queue and a certain rate at which data is aggregated by the queue. The triggering may depend on a combination of the queue build-up information and the link capacity information. The combination may be a logical conjunction.

At least in some embodiments, a more accurate switching decision can be achieved based on the combined information. In same or some other embodiments, accounting for the queue build-up at the queue serving the tunnel can prevent an unnecessary switching of the tunnel. Combining the information as to the queue build-up (also referred to as queue build-up information) with the information as to the link capacity (also referred to as link capacity information) allows at least some embodiments to explicitly or implicitly differentiate between a case of capacity degradation affecting the tunnel and a case of traffic overload of the tunnel. Some implementations of the technique may obviate a measurement of the actual capacity needed by the tunnel or may avoid a computation of remaining capacity headroom for the tunnel.

The tunnels served by the same queue may have the same Quality of Service (QoS) requirements. Not necessarily all tunnels that are supported by the same queue are rerouted. Only complete tunnels may be rerouted.

The link capacity information may indicate a reduction in the link capacity, e.g., due to a change in a modulation level applied to the link. The link capacity information may be provided by the link.

The queue build-up information may indicate a queue length of the queue serving the tunnel. The queue build-up information may be obtained by checking the queue length. The queue length may be checked by continuously or periodically monitoring the queue length. Indicating or checking the queue length may encompass determining the queue length or comparing the queue length.

A queue threshold may be set for each of the one or more queues. The switching of the tunnel may be triggered, if the queue length of the queue serving the tunnel exceeds the respective queue threshold. The queue build-up information may include a result of a comparison between the queue length and the queue threshold.

The queue length may represent an amount of data currently stored in the queue for the tunnel. The queue build-up information may be indicative of the queue length or its relation to the queue threshold. The queue length exceeding the queue threshold may indicate the queue build-up. The queue length of the queue exceeding the respective queue threshold of the queue may indicate the queue build-up at the queue.

The switching may be triggered during a case of reduced link capacity of the at least one of the links of the first routing path. The link capacity information may indicate the case of reduced link capacity and/or may quantify the reduction in link capacity. The reduced link capacity may be transient. The link capacity information may indicate a transient case of link capacity reduction or a current state of the at least one of the links. The queue build-up may be checked periodically or continuously while the link capacity remains reduced. Alternatively or in combination, the reduction in the link capacity may be checked or monitored while the queue build-up is indicated, e.g., by the queue build-up information.

The triggering of the switching may be based on the occurrence of both the reduction in the link capacity and the queue build-up. The queue at which the queue build-up occurs may be upstream of the link at which the reduction in the link capacity occurs.

The network may include at least one intermediate node along the first routing path between the end nodes. The first routing path may include the first and second end nodes, the at least one intermediate node and links between the nodes.

At least one of the queue build-up information and the link capacity information may be at least one of available, determined, gathered, received and generated by the intermediate node. In at least some implementations, the individual queue build-up information and/or the individual link capacity information is not necessarily available at the end nodes. The queue build-up information and the link capacity information may be combined at the intermediate node.

The intermediate node may trigger the switching by informing the end node as to the switching of the tunnel. The end node may thus be informed as to a result of the combination of the queue build-up information and the link capacity information. The intermediate node may inform the end node explicitly, e.g., by transmitting a message, or implicitly, e.g., by the absence of a message expected at the end node. The intermediate node may trigger the switching by generating a control message. The control message may be provided to the end node. Alternatively or in addition, the intermediate node may trigger the switching by dropping data frames including a continuity check message. The continuity check message may be communicated along the first routing path, e.g., by periodically transmitting data frames including the continuity check message. The end node may be adapted to reroute the tunnel from the first routing path to the second routing path in response to the loss of certain continuity check messages.

The one or more queues may be associated to one of the at least one intermediate node along the first routing path. For example, a plurality of queues may be provided at the intermediate node. A scheduler of the intermediate node may control the plurality of queues. The scheduler may further control a transmission using the at least one link of the first routing path.

Each of the at least one intermediate node along the first routing path may have access to information as to which of the tunnels is to be switched in case of a given link capacity. For example, some or each of the at least one intermediate node along the first routing path may include a table containing the information as to which of the tunnels is to be switched in case of a given link capacity. The table may associate a queue to a given tunnel. Alternatively or in combination, the table may associate a minimum link capacity to a given tunnel. Alternatively or in combination, the table may associate the queue threshold to a given tunnel.

Data frames belonging to a tunnel may include an identifier indicative of the tunnel. The intermediate node may be adapted to read the identifier. The intermediate node may be configured to determine, e.g., based the identifier, at least one of the queue associated to the tunnel, the minimum link capacity associated to the tunnel and the queue threshold associated to the tunnel.

The switching may be triggered in response to the occurrence of the queue build-up and the reduction in link capacity. The switching may be triggered immediately when the information indicates the queue build-up. Alternatively, the switching may further be subject to the queue build-up remaining for a certain period of time. In some implementations, the triggering of the switching may include starting a timer. The timer may be started in response to the occurrence of the queue build-up and the reduction link capacity. The switching may further be subject to the queue build-up remaining until the timer expires. For example, the switching may further be subject to the queue length remaining larger than the queue threshold until the timer expires.

The switched tunnel may be switched back from the second routing path to the first routing path when the link capacity fulfils the minimum link capacity and/or another switch-back link capacity for a certain period of time. The switch-back link capacity may be higher than the minimum link capacity. The minimum link capacity may be associated to the switched tunnel. The switch-back link capacity may be associated to the link, e.g., a maximum capacity of the link. The minimum link capacity may be retrieved from the information as to which of the tunnels is to be switched in case of a given link capacity. The minimum link capacity may be retrieved from the table.

The at least one link along the first routing path, some other link or all links along the first routing path and/or the second routing path may include microwave equipment.

The network may be a telecommunications network. For example, the network may be a telecommunications backhaul network. The telecommunications backhaul network may interconnect a public data network and a radio access network.

According to still another aspect, a computer program product is provided. The computer program product comprises code portions for performing one or more of the steps of the method described herein, when the computer program product is executed on one or more computing devices. The computer program product may be stored on a computer-readable recording medium such as a permanent or re-writable memory. The computer program product may also be provided for download in one or more computer networks, such as the Internet, a cellular telecommunications network or a wireless or wired Local Area Network (LAN).

As for a hardware aspect, a device for controlling network routing in a network is provided. The network includes a first end node and a second end node connectable along a first routing path via at least one link. The network further provides a second routing path including the first end node and the second end node. The device is adapted to provide one or more queues, each of which serves at least one tunnel along the first routing path; and to trigger a switching of at least a portion of the at least one tunnel to the second routing path based on a combination of information as to a queue build-up at the queue serving the tunnel and information as to a link capacity of at least one of the links of the first routing path.

As for a further hardware aspect, a network is provided. The network comprises a first end node and a second end node connectable along a first routing path via at least one link, wherein the network further provides a second routing path including the first end node and the second end node; and a device for triggering network routing in the network according to one or more of above-mentioned aspects.

BRIEF DESCRIPTION OF THE DRAWINGS

In the following, further details and advantages of the disclosure are described with reference to exemplary embodiments illustrated in the drawings, wherein FIG. 1 schematically illustrates a telecommunications network as an exemplary environment for implementing the present disclosure.

DETAILED DESCRIPTION

In the following, for purposes of explanation and not limitation, specific details of the technique are set forth, such as particular sequences of steps, components and configurations, in order to provide a thorough understanding of the present disclosure. It will be apparent to a person skilled in the art, that the disclosure may be practiced in other embodiments that depart from these specific details. For example, while the embodiments are described with reference to a telecommunications backhaul network, it will be apparent to a person skilled in the art that the disclosure can also be practiced in the context of any other mobile or stationary data network, or a combination thereof. Furthermore, while the disclosure is primarily described in the context of Ethernet OAM according to the Recommendation ITU-T Y.1731 and the standard document IEEE 802.1ag using continuity check messages according to the protocol defined in the standard document G.8031/Y.1342 on Ethernet Linear Protection Switching mechanism, the disclosure may also be applied in the context of any other protection switching mechanism, such as a network using Multiprotocol Label Switching (MPLS) mechanism and/or continuity check messages according to the MPLS Transport Protocol (TP).

Moreover, those skilled in the art will appreciate that services, functions, logic components and steps explained herein may be implemented using software functioning in conjunction with a programmed microprocessor, or using an Application Specific Integrated Circuit (ASIC), a Digital Signal Processor (DSP), or a general purpose computer. It will also be appreciated that, while the following embodiments are described in the context of methods and devices, the technique may also be embodied in a computer program product as well as in a system comprising a computer processor and a memory coupled to the processor, wherein the memory is encoded with one or more programs configured to execute the services, functions, logic components or steps disclosed herein.

Figure 1:
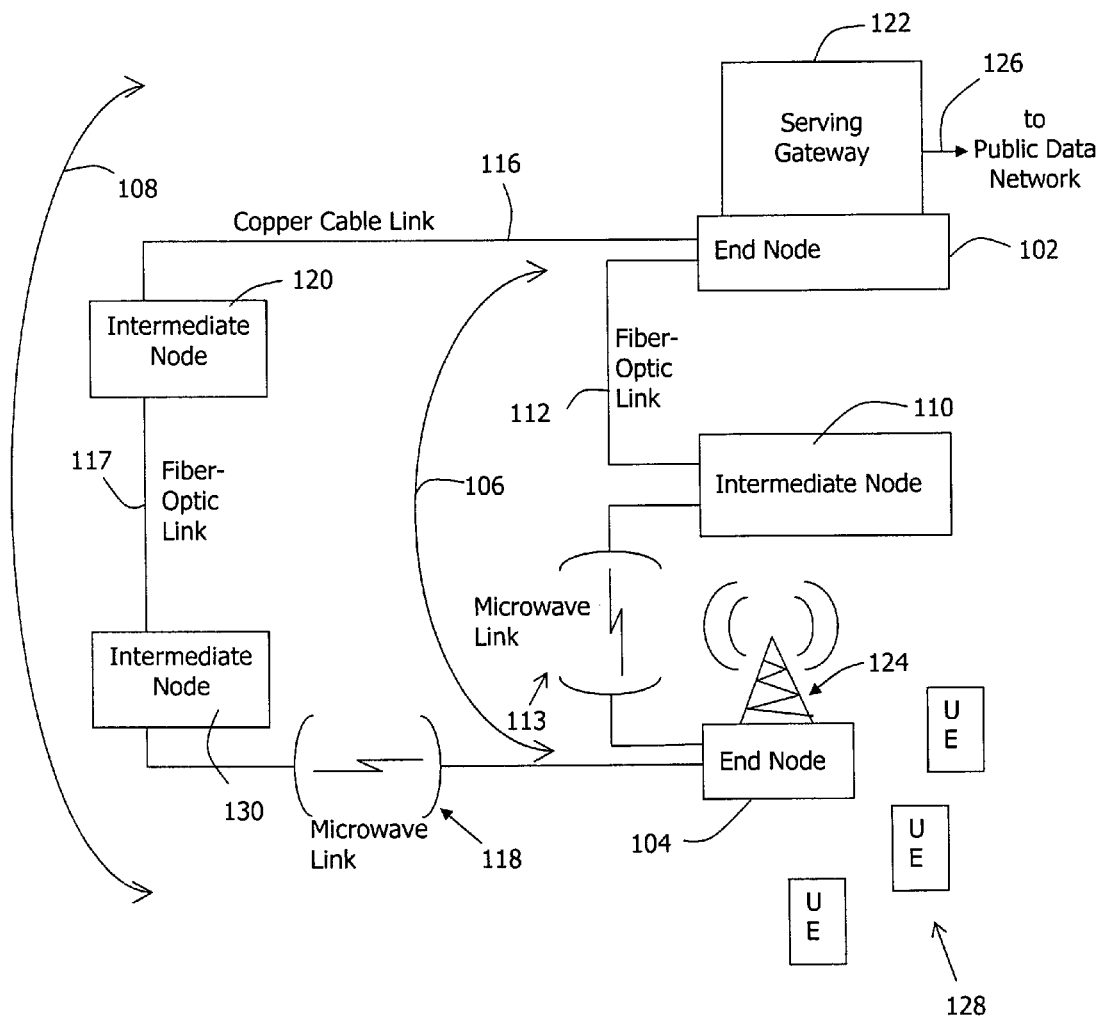

FIG. 1 shows an exemplary network 100 for practicing the technique disclosed herein. The network 100 includes a first end node 102 and a second end node 104. The first end node 102 and the second end node 104 are connected via a first routing path 106 and a second routing path 108. The second routing path 108 is different from the first routing path 106. The first routing path 106 includes at least one an intermediate node 110. The second routing path 108 includes different intermediate nodes 120 and 130. A functionality provided by each of the intermediate nodes 120 and 130 may correspond to the functionality of the intermediate node 110.

The first routing path 106 further includes a plurality of links for connecting the nodes of the first routing path 106 in a linear topology. Similarly, the second routing path 108 includes a plurality of links connecting the end nodes 102 and 104 via the intermediate nodes 120 and 130 in a linear topology. In the exemplary network 100, shown in FIG. 1, the first end node 102 is connected to the intermediate node 110 via a fiber-optic link 112. The intermediate node 110 is connected to the second end node 104 via a microwave link 113.

The topology of the network 100 shown in FIG. 1 is a simplified example of a double-connected network. As a variant, the network 100 can include more than one second routing path 108 for data connection between the first end node 102 and the second end node 104.

In the second routing path 108, the first end node 102 is connected to the intermediate node 120 via a copper cable link 116. The intermediate node 120 is connected to the intermediate node 130 via a fiber-optic link 117. The intermediate node 130 is connected to the second end node 104 via a microwave link 118. In a variant, the links along one or each of the first routing path 106 and the second routing path 108 use equal implementations on a physical layer or implementations deviating from those shown in FIG. 1.

FIG. 1 shows a telecommunications backhaul network as an example of the network 100. The first end node 102 includes a serving gate way 122 providing a connection 126 to a Public Data Network (PDN). The second end node 104 includes a base station 124. The base station 124 is a wireless connection to a plurality of User Equipments (UEs)

128. Services available by means of the PDN are thus provided to the UEs 128 by routing data frames belonging to the different services along the first routing path 106 or the second routing path 108. Such services include voice services and data services.

In more detail, service types can include one or more of Guaranteed Bit Rate (GBR) voice services, Circuit Emulation Services (CES), highly available Committed Information Rate (CIR) services and Minimum Rate Streaming Video services. The GBR voice services have limited tolerance to loss, delay and jitter. Users tolerate only very short time of outage. This means that service restoration should be completed within, e.g., 50 ms to avoid termination of the voice session by the user. The CESs do not tolerate an insufficient bandwidth. In case of insufficient bandwidth, the CESs will collapse. Furthermore, since the CESs typically carry voice traffic, the voice requirements, e.g., as to the restoration time, should be fulfilled. Examples of CIR services include use cases, when the Radio Access Network (RAN) and the mobile telecommunications backhaul network 100 are operated by different operators. For example, the RAN operator can lease a fixed capacity transport pipe from the operator of the telecommunications backhaul network 100 and use hierarchical scheduling at one of the end nodes for managing its resource sharing control. If the pipe capacity becomes smaller than the value defined in the Service Level Agreement (SLA), the resource sharing control mechanism of the RAN operator will not work properly anymore. In the case of the Minimum Rate Streaming Video service, a minimum rate for video streams should be guaranteed for user satisfaction. Otherwise, the users will terminate the service.

The telecommunications backhaul network 100 allows establishing a plurality of tunnels between the first end node 102 and second end node 104. Each of the tunnels can be associated to one of the services. More precisely, the tunnel is associated to an instance of a service. One service can require more than one tunnel. The tunnels are associated to one of the routing paths 106 and 108. The end nodes 102 and 104 route data frames along one of the routing paths 106 and 108 according to the association of the tunnel to which the data frame belongs. Changing the association between service tunnel and its routing path is also referred to as switching of the tunnel.

Assuming that the first routing path 106 is used as a primary routing path, a reduction in link capacity at one of the links 112 and 113 along the first routing path 106 can be due to a technical failure. The reduction can also be part of a normal mode of operation, such as Adaptive Modulation (AM). As an example of AM, the microwave links 113 and 118 are planned for a small Bit Error Rate (BER) at 114 Mbit/s resulting in an availability of 99.999%. The high availability is achieved using Quadrature Amplitude Modulation with four constellation points (4 QAM) as a basic modulation. The bit rate of 114 Mbit/s achieved by using 4 QAM is provided to services with strict Quality of Service (QoS) guarantees, such as voice and GBR services.

In case of good radio conditions, e.g., a low Signal-to-Noise Ratio (SNR) of the radio channel used by the microwave link 113, the AM automatically changes to a higher modulation level. Since the higher modulation level provides a higher data rate but is not as often available as the planned basic modulation level according to 4 QAM, the increased data rate is associated with lower availability. For example, the next higher modulation level provides 233 Mbit/s at an availability of 99.995%. The next further modulation level provides 352 Mbit/s at an availability of 99.99%. A bit rate of 402 Mbit/s is achieved with 99.95% availability. The highest modulation level according to 256 QAM is used in very good radio conditions and enables the microwave link 113 to provide a bit rate of 455 Mbit/s with 99.9% availability. The higher modulation levels are used for services without strict service guarantees, such as best-effort data services, progressive download, etc.

An exemplary case of reduction in link capacity occurs when the link 113 of the first routing path 106 changes to a lower modulation level. The reduction in link capacity may be necessary to maintain a pre-defined BER as the SNR decreases, e.g., due to precipitation between receiving and sending antennas of the microwave link 113.

Conventional methods of controlling network routing in a network having a double-connected topology similar to the network 100 include Ethernet Linear Protection Switching (ELPS) mechanism according to the Recommendation ITU-T G.8031/Y.1342 by the International Telecommunication Union (ITU) and Automatic Linear Protection Switching (ALPS) mechanism according to the MPLS Transport Protocol (MPLS-TP) defined in specifications of the Internet Engineering Task Force (IETF). Such conventional mechanisms detect only a link failure, which can be too late for protecting a service that is affected by the reduced link capacity.

In an illustrative example of a method of controlling network routing in a network having a topology such as or similar to the network 100, exact information is needed about an actual traffic volume for considering traffic information in a rerouting decision. Such information about traffic can be obtained by using performance monitoring functions between the end nodes 102 and 104, e.g., using loss measurement in a Maintenance Association defined by the end nodes 102 and 104 functioning as Maintenance End Points (MEP).

Both active and passive performance monitoring solutions are available. In case of active monitoring, so-called probe packets are injected into the network 100 at a source point and a sink point calculates which percentage of the probe packets is lost within a measurement period. In case of passive monitoring, the source point and the sink point calculate the incoming and received packets, respectively, and the loss ratio can be calculated from the difference. The source point is also referred to as an ingress node and the sink node is also referred to as an egress node, e.g., in the context of MPLS networks according to RFC 3031.

However, when traffic information is obtained from a performance measurement, at least the following two limitations can be identified in some implementations. First, a timescale of the measurement is often too long. In order to guarantee a short restoration time, e.g., equal to or less than 50 ms, a traffic loss measurement has to be performed in extremely short periods, which is problematic in itself. In practice, typical periods for the traffic loss measurement vary between 100 ms and 1 s, or even longer time. If service tunnel rerouting has to be performed within, e.g., 50 ms, the measurement period should be, e.g., approximately 20 ms to 30 ms. During the measurement period, which is even shorter than the restoration time, it is not possible to get adequate information about the actual traffic situation in the network 100. For example, if the modulation level of the link 113 employing AM is changed to a lower modulation level at the end of the n-th measurement period, the proper loss can only be detected at the end of the (n+1)-th period. To sum up, the timescales required for performance measurement and service restoration pose a significant problem, since a measurement period short enough to comply with the required restoration time does not result in correct information as to the traffic. Furthermore, a delay will almost always occur due to the predetermined periodicity of the measurement, since the traffic loss can be detected only in the next measurement period. If the length of the measurement period is small, then this "extra" delay is small, but the measurement will be less accurate. As a consequence, rerouting within, e.g., 50 ms can often not be supported by measurement.

A second limitation associated with performance measurements, relates to link capacity degradation and traffic overload. Solely based on traffic loss, the end nodes 102 and 104 cannot differentiate between a case of loss as a consequence of capacity degradation and a case of traffic overload. Some throughput information can be used in this case, but above-identified problems as to timescales still persist. There is often not enough time to get information for supporting a rerouting within, e.g., 50 ms. This problem is solved by at least some embodiments, since part of the rerouting trigger is the Adaptive Modulation downswitch, which indicates that the link capacity is degraded.

Based on the above, it can be concluded that solely relying on performance measurements does often not provide enough exact information about the actual traffic volume so as to support a decision on protection switching within a restoration time required by at least some types of services.

Figure 2:
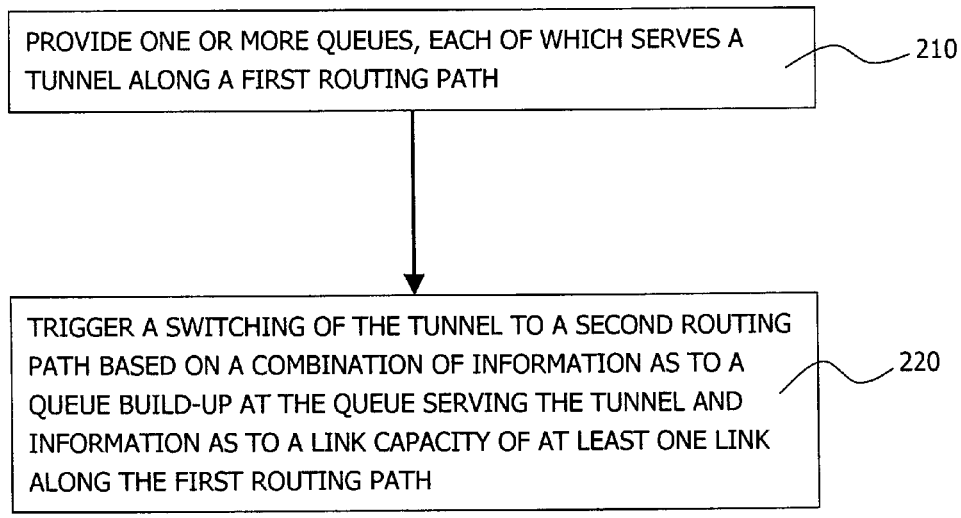
FIG. 2 shows a flowchart of an embodiment of a method of controlling network routing in the network of FIG. 1.

FIG. 2 shows a flowchart of a method 200 of controlling network routing in a network including a first end node and a second end node. The first and second end nodes are connected or connectable along a first routing path via at least one link. The network further provides a second routing path different from the first routing path. The second routing path includes the same first and second end nodes. The methods 200 may be performed in the network 100 shown in FIG. 1. More specifically, the method 200 can be employed for controlling the network 100. The method 200 can be partially or completely implemented in one or all intermediate nodes, such as the intermediate node 110, along the first routing path 106. In an extended embodiment of the network 100, the method is implemented in all intermediate nodes along both the first routing path 106 and the one or more second routing path 108.

In a step 210 of the method 200, one or more queues are provided. Each of the queues serves one or more tunnels along the first routing path 106. In a step 220 of the method 200, a switching of the tunnel to the second routing path 108 is triggered based on a combination of information as to a queue build-up at the queue serving the tunnel, and information as to a link capacity of at least one link along the first routing path.

The switching of the tunnel is also referred to as protection switching or rerouting. The technique allows activating the protection switching only if required by link capacity degradation and/or traffic situation. In other words, the technique generates a protection switching trigger based on the combined link capacity information and queue build-up information so that rerouting of a tunnel will be performed only if it is required due to degradation of the services carried by the tunnel.

Figure 3:
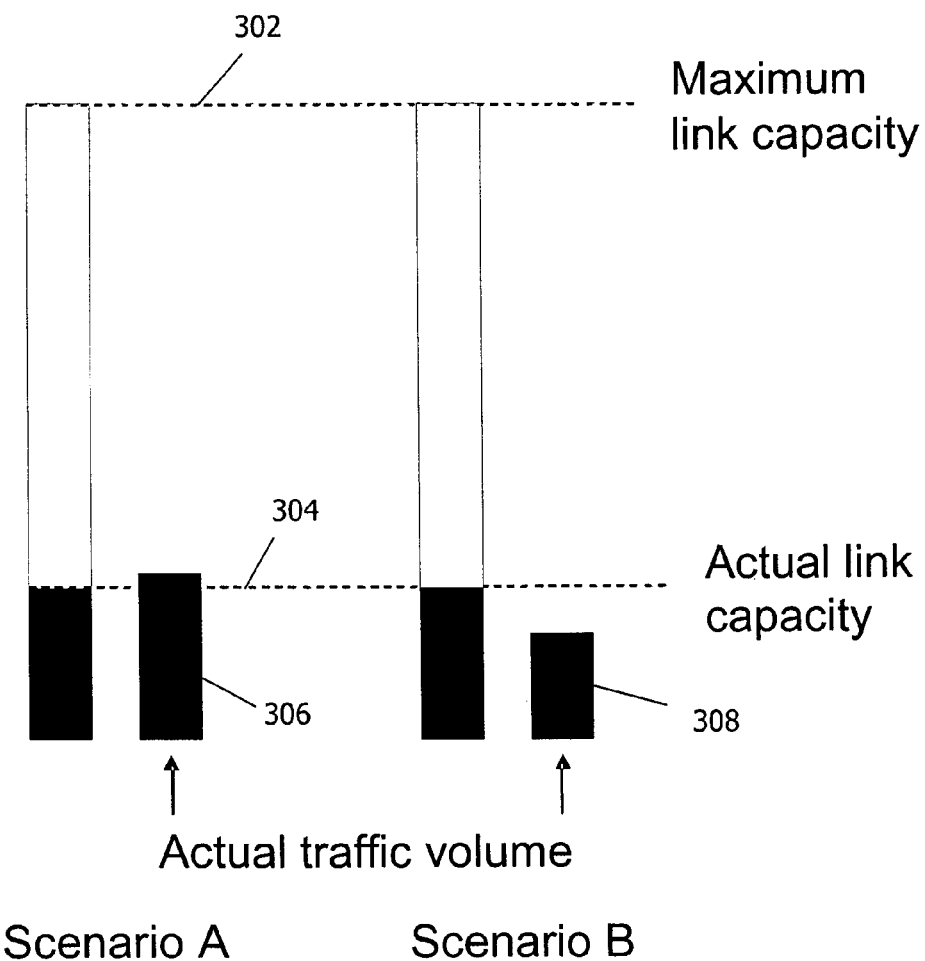
FIG. 3 illustrates two scenarios for controlling network routing.

FIG. 3 schematically illustrates a reduction 300 in link capacity. The case of the reduced link capacity is discussed for two scenarios denoted by A and B. The link capacity of the link 113 is reduced from a maximum link capacity 302 to the current or actual link capacity 304. In the scenario A, the current volume of guaranteed traffic 306 is larger than the actual link capacity 304. Consequently, rerouting is necessary, e.g., to protect the service underlying the corresponding tunnel. In contrast, in scenario B, the traffic volume 308 is less than the actual link capacity 304. Consequently, rerouting is not needed.

The present disclosure allows avoiding such unnecessary switching of the tunnel from the first routing path 106 to the second routing path 108 functioning as a back-up path. The technique does not require consideration of explicit traffic information in the rerouting decision. Nonetheless, the technique can be extended using a combined switching decision allowing for additional traffic information.

Avoiding the unnecessary switching of tunnels can be extremely important in the case of frequent but short-length (e.g., temporary) link degradations including fast capacity fluctuations that may be caused by multipath fading. In these cases, the technique allows rerouting to be performed only if a traffic situation requires it, which results in a more stable network operation, since there is no frequent, unnecessary switching of tunnels between the primary path and the backup path. The frequent and unnecessary switching is also referred to as "flip-flop".

Figure 4:
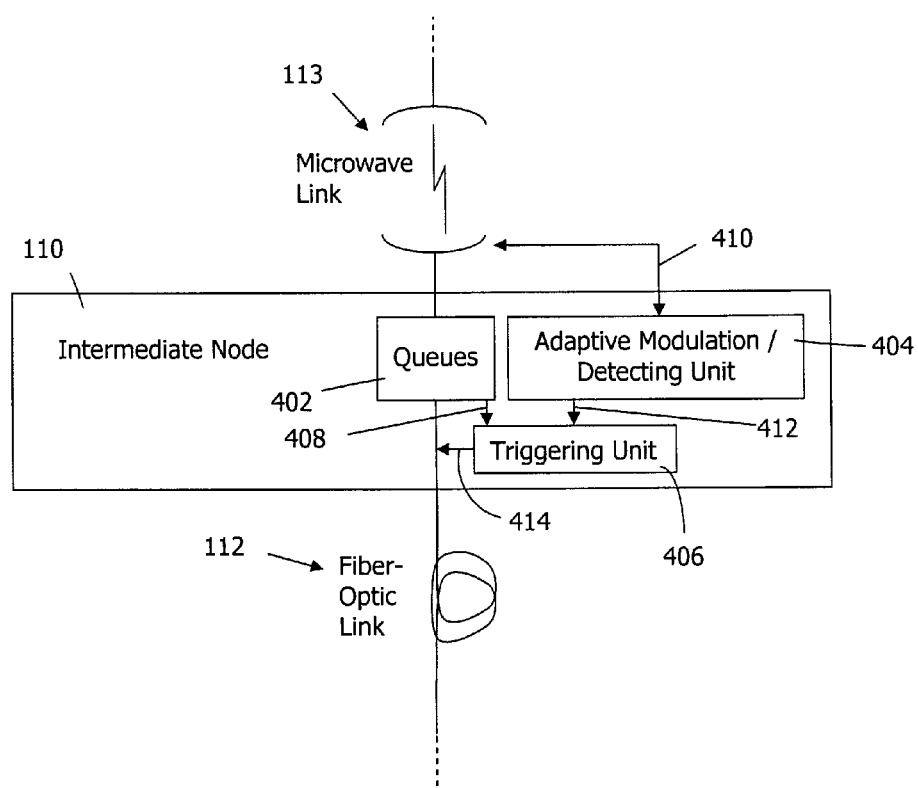
FIG. 4 illustrates an exemplary intermediate node for performing the method of FIG. 2 in the network of FIG. 1.

FIG. 4 schematically illustrates an embodiment of a device 400 adapted to perform the method 200. The device 400 has access to or includes at least one link, such as the links 112 and 113 of the first routing path 106 described with reference to FIG. 1 above. The device 400 further includes an intermediate node, e.g., the intermediate node 110 of the first routing path 106 described above.

The intermediate node 110 includes one or more queues 402, a unit 404 for adaptive modulation and/or detecting a change in the modulation level applied for the link 113, and a triggering unit 406. There is one queue 402 for each of the tunnels, data of which is routed along the first routing path 106. In a variant there is no one to one mapping between queues and tunnels. One queue can serve several tunnels. The queues 402 provide information 408 as to a current queue length and/or the occurrence of a queue build-up to the triggering unit 406.

For example in case of services with strict guarantees, the queue build-up is a very efficient way of detecting the impact on traffic due to link degradation. Typically, guaranteed services have strict delay and jitter requirements. Consequently, the queue size is small, e.g., compared to queues that serve Transmission Control Protocol (TCP) flows. When the traffic situation causes an overload then fast queue build-up is detected, which indicates that the impacted service is started to be degraded. This makes it possible to consider traffic information in the protection switching decision and to trigger the rerouting of the one or more impacted tunnels within the required restoration time, e.g., within 50 ms.

The unit 404 is in communication 410 with the link 113. In one variant of the embodiment of the device 400, the unit 404 is adapted to control the adaptive modulation of the link 113. In particular, the unit 404 is adapted to induce a reduction in link capacity of the link 113 in response to a change of channel conditions. In another variant of the embodiment of the device 400, the unit 404 is adapted to detect a current modulation level applied by the link 113. In particular, the unit 404 is adapted to detect the reduction 300 in link capacity. In all variants, the unit 404 provides information 412 as to the link capacity of the link 113 to the triggering unit 406.

The triggering unit 406 is adapted to perform the step 220 of the method 200. The triggering unit 406 combines the queue build-up information 408 and the link capacity information 412. Based on a result 414 of the combination, a switching of the tunnel (e.g., away from the first routing path 106) is triggered.

Various ways of combining the two pieces 408 and 412 of information can be implemented in the triggering unit 406. For example, the queue build-up information may indicate the presence of an unusually long queue or an unusually rapidly growing queue. Such indications are collectively referred to as queue build-up. The link capacity information 412 can indicate a case of reduced link capacity, also referred to as link capacity degradation. The case of reduced capacity includes a transient period during which a lower modulation level is applied by the link 113. The combination can be a logical conjunction of the information 408 indicating that the queue build-up occurs as the information 412 indicates the case of reduced link capacity, in which case the result 414 of the combined pieces of information 408 and 412 includes a trigger for the switching. Otherwise, if no rerouting is necessary, no result 414 is output.

The intermediate node 110, or the triggering unit 406, inform at least one of the first end node 102 and the second end node 104 about the result 414, if rerouting is necessary.

In one embodiment of the device 400, the result is provided as control message. The intermediate node 110 generates a message to carry the rerouting trigger to one of the end nodes 102 and 104. Currently, there is no such standardized message, but for example the extension of the Automatic Protection Switching message described in Recommendation ITU-T Y.1731 or in standard document IEEE 802.1ag could be used for this purpose. Embodiments based on a control message can be standardized, e.g., for technical compatibility of the intermediate node 110 and end nodes 102, 104.

In another embodiment of the device 400, an active and/or explicit dropping of frames including a connectivity check message is applied for informing at least one of the first end node 102 and the second end node 104. According to the ITU-T Recommendation Y.1731, Continuity Check Messages (CCMs) are used to verify whether the first routing path 106 is available or down between the two end nodes 102 and 104. In case of a link failure, the CCMs are lost. The missing of the CCMs informs one of the end nodes 102 and 104 that protection action is needed. Active drop of CCM frames makes it possible to trigger rerouting of impacted tunnels to the second routing path 108 or any other backup path. This embodiment does not directly impact the Y.1731 standard. It requires an extended operation of one or more of the intermediate nodes, e.g., the intermediate node 110. The dropping of continuity check messages at intermediate nodes is not limited to CCMs according to the Y.1731 standard. Any kind of continuity check messages, e.g., messages exchanged for detecting failure in MPLS networks, can be used as well. Details on actively dropping continuity check messages are also provided in provisional application US 61/560,551.

The triggering unit 406 thus provides the result 414 of the combined pieces 408 and 412 of information to the end node 102 and/or 104. The end node 102 and/or 104 explicitly or implicitly receives the result 414. In one implementation of queue build-up detection, the triggering unit 106 provides the result 414 immediately and the receiving end node 102 and/or 104 effects the switching of the tunnel immediately. In another implementation of queue build-up detection, the switching of the tunnel is delayed. During the delay the queue at which the queue build-up has occurred is monitored. If the queue build-up persists during the delay, the switching is triggered. The first-mentioned implementation can be considered as a simpler implementation compared to the second-mentioned implementation. The second-mentioned implementation can prevent rapidly switching back and forth between the routing paths 106 and 108.

Figure 5:
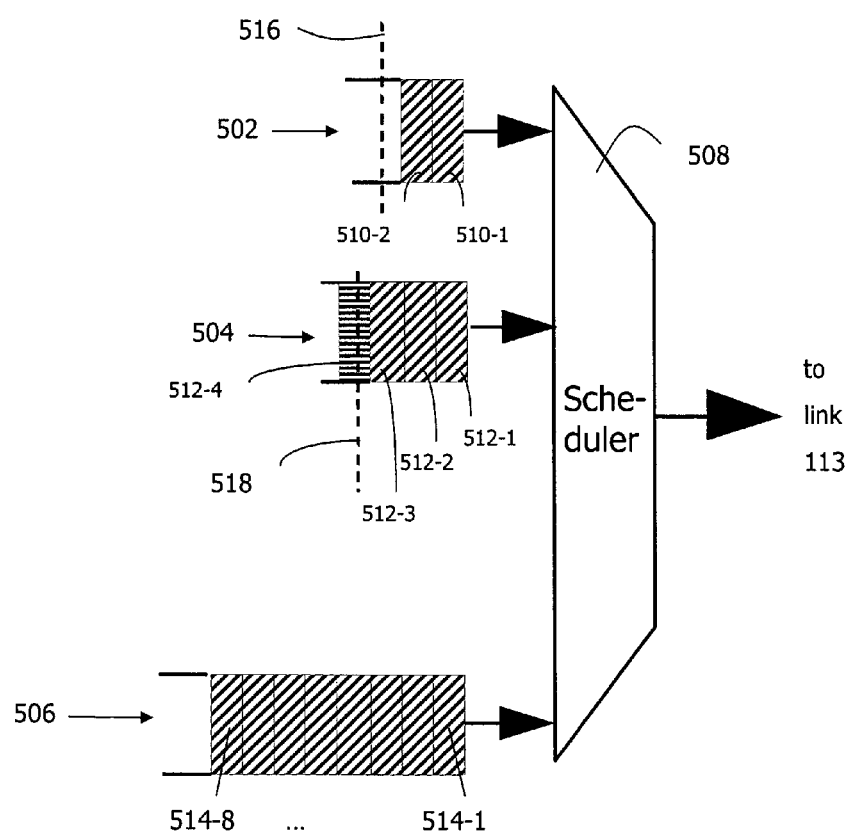
FIG. 5 illustrates an example of a plurality of queues controlled by a schedule in the intermediate node of FIG. 4.

FIG. 5 schematically illustrates further details of the queues 402. The queues 402 include a first queue 502, a second queue 504, and a third queue 506. Each of the queues 502 to 506 provides the functionality of a First In-First Our (FIFO) buffer. The intermediate node 110 further includes a scheduler 508 adapted to multiplex the queues 502 to 506 to the link 113. An output of each of the queues 502 to 506 is coupled to the scheduler 508. The scheduler reads from the output of the queues 502 to 506 according to a Round-Robin scheme. Frames stored in the queues 502 to 506 are denoted by reference signs of the format xxx-y in FIG. 5, wherein the number "y" indicates the order of read-out for a given queue. In each time step of the time-sharing applied by the scheduler 508, one of the frames 510-1, 512-1 or 514-1 is read depending on which of the queues 502 to 506 is processed in the current time step according to the Round-Robin scheme.

Thresholds 516 and 518 are setup for the queues 502 and 504, respectively. If the queue length of the one or more queues 502, 504 serving at least one impacted tunnel exceeds its queue threshold 516 or 518 during a case of link degradation, the result 414 indicates that the at least one impacted service is started to be degraded.

In the situation show in FIG. 5, the first queue 502 has a queue length below the threshold 516 that is associated to the first queue 502. The second queue 504 has a queue length exceeding its queue threshold 518 as a fourth frame 512-4 is input into the second queue 504. In this situation, the triggering unit 406 triggers the rerouting so as to switch the at least one impacted tunnel to the second routing path 108 functioning as the backup path. In case of more than one backup path, the rerouting one of the end nodes 102 and 104 further decides upon which of the plurality of backup paths takes the role of the second routing path 108.

In the first-mentioned implementation of queue build-up detection, the rerouting action is triggered immediately when the queue threshold is violated. In the second-mentioned implementation of queue build-up detection, a timer is started when the queue threshold is violated. If during a given time period T the queue length remains larger than the threshold, the rerouting action is triggered immediately. The second-mentioned implementation causes some delay in the detection but can avoid rerouting, if the link capacity degradation can be managed by queuing in case of the current traffic situation, e.g., in case of a transient congestion or an overload due to a transmission burst.

Figure 6:
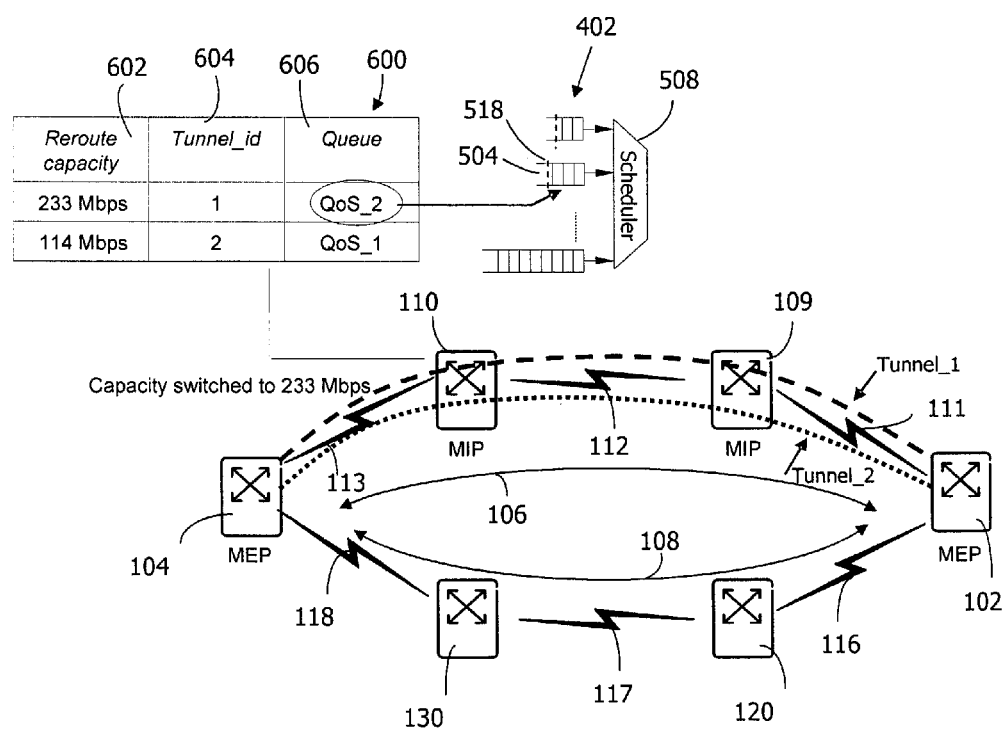
FIG. 6 schematically illustrates an exemplary configuration of an intermediate node within the network of FIG. 1.

FIG. 6 schematically illustrates further details of performing the method 200 by means of the intermediate node 110. The detection of service degradation is based on a local and temporally coincidence of the queue build-up and the case of link capacity degradation in the network 100.

The end nodes 102 and 104 define a Maintenance Association (MA) and are referred to as Maintenance End Points (MEPs). The example of the network 100 shown in FIG. 6 further includes Maintenance Intermediate Points (MIPs) 109 and 110, each of which implements the functionality of the intermediate node 110 described above. The MIPs are also referred to as Management Intermediate Points.

The first routing path 106 includes the MEPs 102 and 104, the MIPs 109 and 110 between the MEPs 102 and 104, and a plurality of links 111, 112, 113 arranged to linearly connect the nodes 102, 109, 110, 104. The network 100 further provides a second routing path 108 including the same MEPs 102 and 104, different MIPs 120 and 130 providing the functionality of the intermediate node 110 described above, and a plurality of links 116, 117, 118 connecting the nodes 102, 120, 130, 104 along the second routing path 108.

Each intermediate node 109 and 110 along the first routing path 106 (functioning as primary routing path) includes a table 600. The table 600 contains information as to which tunnels indicated in a column 604 should be rerouted in case of a given link capacity indicated in a column 602. The column 602 thus defines a minimum link capacity. The table 600 further allows determining which one or more queues indicated in a column 606 serve the one or more services carried by the given tunnel indicated in the column 604, as can be seen in FIG. 6.

If the microwave link capacity is switched to a certain value, the impacted MIP node 110 checks its table 600. If there is an entry or entries for the current link capacity (e.g., a minimum link capacity that is equal to or higher than the current link capacity), the impacted or associated one or more tunnels are identified and the actual queue length of the one or more queues, which serve frames belonging to the tunnels, are started to be monitored.

If the queue threshold 518 of the queue 540 is not violated, the MIP node 110 does not do any (triggering) action. The traffic, e.g., including the tunnels "Tunnel_1" and "Tunnel_2", is kept on the primary path 106.

The queue build-up is checked continuously while the microwave link 113 is degraded. If the actual length of the queue 504 becomes larger than the threshold 518, congestion is detected and degradation of the service carried by the tunnel "Tunnel_1" is assumed, since it seems that there is not enough capacity to carry the traffic of the tunnel "Tunnel_1". Then, the MIP 110 informs the MEP 104 that rerouting is necessary. Examples on implicitly or explicitly providing the information to trigger the rerouting have been described above.

The first column 602 of the table 600 indicates the minimum link capacity for routing the tunnel identified by the tunnel identifier "Tunnel_id" included in the second column 604 of the corresponding line of the table 600. The queue associated to the corresponding tunnel is indicated in the third column 606 of the table 600.

In an extended embodiment of the method 200 and the intermediate node 110, a back-rerouting or back-switching of the tunnel "Tunnel_1" from the backup path 108 to the primary path 106 can be performed, if the degraded link capacity (e.g., below 233 Mbps) is increased to the required value (e.g., above 233 Mbps) and if this link capacity remains stable for a given time. In the extended embodiment, the flip-flop between the primary path 106 and the secondary paths 108 can be avoided. In some implementations, a drawback of the extended embodiment could be that traffic awareness is lost in the tunnel back-switching. Even if the primary tunnel (i.e., the tunnel "Tunnel_1" routed along the primary path 106) could serve the traffic, the "Tunnel_1" is kept on the secondary path 108, until the link 113 is changed to a higher capacity on the primary path 106 (e.g., by AM switching up the link 113 to a higher modulation level).

As has become apparent from the above exemplary embodiments, at least some of the embodiments realize a protection switching mechanism that is performed for one or more impacted tunnels only if a traffic situation requires the switching. If the current traffic volume can be handled by the available (degraded) link capacity, the traffic is kept on the primary path. Same or other embodiments provide that unnecessary rerouting and/or frequent switching between primary and backup paths can be avoided. Latter is important in cases of frequent but short-term link degradation, e.g., due to multipath fading.

At least some implementations can achieve a short restoration time. E.g., some embodiments can perform rerouting within 50 ms.

Certain implementations do not require amendments at edge nodes (e.g., at Maintenance End Points) in the course of the implementation and/or do not require non-standardized features at the edge nodes. In same or some other implementations, the Maintenance Intermediate Points should support the triggering of the rerouting based on a queue build-up.

The technique can even be applied in case of complex topologies and/or multi-edge networks. At least in some implementations, there is no impact on an operation if the degraded tunnels are handled by different edge nodes, e.g., different Maintenance End Points. In same or some other implementations, there is no impact on the operation, if backup paths of the tunnels are different.

The technique can be implemented independent of a network technology. The technique can be generalized and/or used independent from the network technology. The technique can be implemented with any kind of alternatives as to how an end node is informed about the necessity of rerouting.

The invention claimed is:

1. A method of controlling network routing in a network including a first end node and a second end node connectable along a first routing path via at least one link, wherein the network includes at least one intermediate node along the first routing path between the end nodes, the network further providing a second routing path including the first end node and the second end node, the method comprising:
    providing one or more queues, each of which serves at least one tunnel along the first routing path, wherein the one or more queues are associated to one of the at least one intermediate node along the first routing path; and
    triggering a switching of at least a portion of the at least one tunnel to the second routing path based on a combination of information as to a queue build-up at the queue serving the tunnel and information as to a link capacity of at least one of the links of the first routing path, wherein triggering the switching comprises the intermediate node providing a control signal reflecting a result of the combination of information to at least one of the end nodes.

2. The method of claim 1, wherein the information as to the queue build-up is obtained by checking a queue length.

3. The method of claim 1, wherein a queue threshold is set for each of the one or more queues.

4. The method of claim 3, wherein the switching of the tunnel is triggered when a queue length of the queue serving the tunnel exceeds the respective queue threshold.

5. The method of claim 1, wherein the switching is triggered during a case of reduced link capacity of the at least one of the links of the first routing path.

6. The method of claim 5, wherein the queue build-up is checked continuously while the link capacity remains reduced.

7. The method of claim 1, wherein a reduction in the link capacity is monitored while the information indicates the queue build-up.

8. The method of claim 1, wherein at least one of the queue build-up information and the link capacity information is generated or available at the intermediate node.

9. The method of claim 1, wherein the queue build-up information and the link capacity information are combined at the intermediate node.

10. The method of claim 1, wherein the intermediate node triggers the switching by dropping data frames including a connectivity check message.

11. The method of claim 1, wherein a plurality of queues is provided at the intermediate node and controlled by a scheduler of the intermediate node.

12. The method of claim 1, wherein each of the at least one intermediate node along the first routing path includes a table containing information as to which of the tunnels is to be switched in case of a given link capacity.

13. The method of claim 12, wherein the table associates a queue to a given tunnel.

14. The method of claim 12, wherein the table associates a minimum link capacity to a given tunnel.

15. The method of claim 1, wherein the switching is triggered immediately when the information indicates the queue build-up.

16. The method of claim 1, wherein the triggering of the switching includes starting a timer, the switching being further subject to the queue build-up remaining until the timer expires.

17. The method of claim 1, wherein the switched tunnel is switched back from the second routing path to the first routing path when the link capacity fulfills for a certain time a minimum link capacity associated to the switched tunnel.

18. The method of claim 1, wherein the at least one link along the first routing path includes a microwave link.

19. The method of claim 1, wherein the network is a telecommunications backhaul network.

20. A non-transitory computer-readable recording medium storing a computer program product comprising program code portions that, when executed by a processor in a device, configures the device to:
provide one or more queues, each of which serves at least one tunnel along a first routing path that includes one or more links and further includes at least one intermediate node between first and second end nodes, wherein the first and second end nodes are further interconnected by one or more links along a second routing path that includes one or more links and one or more intermediate nodes; and
trigger a switching of at least a portion of the at least one tunnel to the second routing path based on a combination of information as to a queue build-up at the queue serving the tunnel and information as to a link capacity of at least one of the links of the first routing path, wherein the device is configured to trigger the switching by providing a control signal reflecting a result of the combination of information to at least one of the end nodes.

21. A device for controlling network routing in a network including a first end node and a second end node connectable along a first routing path via at least one link, wherein the network includes at least one intermediate node along the first routing path between the end nodes, the network further providing a second routing path including the first end node and the second end node, the device being adapted to:
provide one or more queues, each of which serves at least one tunnel along the first routing path, wherein the one or more queues are associated to one of the at least one intermediate node along the first routing path; and
trigger a switching of at least a portion of the at least one tunnel to the second routing path based on a combination of information as to a queue build-up at the queue serving the tunnel and information as to a link capacity of at least one of the links of the first routing path, wherein the device is configured to trigger the switching by providing a control signal reflecting a result of the combination of information to at least one of the end nodes.

22. A network comprising:
a first end node and a second end node connectable along a first routing path via at least one link, wherein the network includes at least one intermediate node along the first routing path between the end nodes, wherein the network further provides a second routing path including the first end node and the second end node; and
a device configured to:
provide one or more queues, each of which serves at least one tunnel along the first routing path, wherein the one or more queues are associated to one of the at least one intermediate node along the first routing path; and
trigger a switching of at least a portion of the at least one tunnel to the second routing path, based on a combination of information as to a queue build-up at the queue serving the tunnel and information as to a link capacity of at least one of the links of the first routing path, wherein the device is configured to trigger the switching by providing a control signal reflecting a result of the combination of information to at least one of the end nodes.

* * * * *